United States Patent
Crosby (10) Patent No.: US 11,716,398 B1
(45) Date of Patent: Aug. 1, 2023

(54) ENTERTAINMENT PROFILE SWAPPING SYSTEMS AND METHODS

(71) Applicant: Lisa Crosby, Garwood, NJ (US)

(72) Inventor: Lisa Crosby, Garwood, NJ (US)

(*) Notice: Subject to any disclaimer, the term of this patent is extended or adjusted under 35 U.S.C. 154(b) by 0 days.

(21) Appl. No.: 17/075,075

(22) Filed: Oct. 20, 2020

Related U.S. Application Data (60) Provisional application No. 62/924,636, filed on Oct. 22, 2019.

(51) Int. Cl.
| | | |
|---|---|---|
| *H04L 67/306* | (2022.01) | |
| *H04W 8/18* | (2009.01) | |
| *H04L 12/46* | (2006.01) | |

(52) U.S. Cl.
CPC ........ *H04L 67/306* (2013.01); *H04L 12/4641* (2013.01); *H04W 8/183* (2013.01)

(58) Field of Classification Search
CPC ... H04L 67/306; H04L 12/4641; H04W 8/183
See application file for complete search history.

(56) References Cited

U.S. PATENT DOCUMENTS

| | | | | |
|---|---|---|---|---|
| 9,135,641 | B2* | 9/2015 | Macadaan | H04L 67/306 |
| 2007/0104182 | A1* | 5/2007 | Gorti | H04L 67/306 |
| | | | | 370/352 |
| 2007/0121869 | A1* | 5/2007 | Gorti | H04L 65/80 |
| | | | | 379/201.02 |
| 2009/0234876 | A1* | 9/2009 | Schigel | H04L 67/306 |
| | | | | 707/999.102 |
| 2010/0005006 | A1* | 1/2010 | Green | G06Q 30/0633 |
| | | | | 705/26.1 |
| 2012/0324099 | A1* | 12/2012 | Perez Martinez | H04W 4/18 |
| | | | | 709/224 |
| 2013/0066973 | A1* | 3/2013 | Macadaan | H04L 67/306 |
| | | | | 709/204 |
| 2013/0212648 | A1* | 8/2013 | Tietjen | H04L 63/10 |
| | | | | 726/4 |
| 2014/0372430 | A1* | 12/2014 | Sitruk | G06F 16/337 |
| | | | | 707/736 |
| 2015/0095329 | A1* | 4/2015 | Sanio | G06F 16/48 |
| | | | | 707/732 |
| 2016/0255170 | A1* | 9/2016 | Gargi | H04L 67/306 |
| | | | | 709/204 |
| 2017/0048348 | A1* | 2/2017 | Chen | H04L 67/22 |
| 2020/0004829 | A1* | 1/2020 | Denton | H04L 67/306 |
| 2020/0037153 | A1* | 1/2020 | Anand | H04W 48/18 |
| 2020/0314471 | A1* | 10/2020 | Srinivasan | H04L 67/306 |
| 2022/0248095 | A1* | 8/2022 | Neumann | H04N 21/25891 |

\* cited by examiner

*Primary Examiner* — Nam T Tran
(74) *Attorney, Agent, or Firm* — Gearhart Law, LLC (57) ABSTRACT

Profile swapping systems, methods and apparatus are disclosed involving an intermediary system adapted to connect to a network and adapted to manage interaction of a user on the network based on a profile-in-use being used by the user; and a profile system adapted to manage profiles within the intermediary system and adapted to manage swapping of profiles for use by the user in interacting on the network; wherein the profile system includes a user profile for the user and at least one other's profile; and wherein the profile system is adapted to enable the user to swap the user profile for the other's profile, whereby the user profile is swapped out as the profile-in-use and the other's profile is swapped in as the profile-in-use by the user.

12 Claims, 3 Drawing Sheets

ENTERTAINMENT PROFILE SWAPPING SYSTEMS AND METHODS

CROSS REFERENCE TO RELATED APPLICATION

This application claims priority to U.S. Application 62/924,636 filed on Oct. 22, 2019, the contents of which are herein fully incorporated by reference in its entirety.

FIELD OF THE EMBODIMENTS

The invention relates to systems, methods and apparatus of Internet-based television and social media models, and in particular, to creating, maintaining, and swapping user profiles in a user-specific networked environment intended for use in IP TV, Streaming TV services (e.g., Netflix, Hulu, HBO Now, YouTube TV, and others) and Streaming TV devices (e.g., Apple TV, Roku, Amazon Fire, Google Chromecast, and others) and social media models (e.g., Facebook, and others). The invention also involves swapping out a user's entertainment profile for another person's entertainment profile, such as that for 'cooler' individuals (as perceived by the average consumer). The consumer would have the option to constantly swap out an entertainment profile for another entertainment profile, and so on and so on.

BACKGROUND OF THE EMBODIMENTS

The related art includes, for instance, creating, maintaining, and swapping user profiles in a user-specific networked environment intended for use in IP TV, Streaming TV services (e.g., Netflix, Hulu, HBO Now, YouTube TV, and others), and Streaming TV devices (e.g., Apple TV, Roku, Amazon Fire, Google Chromecast, and others). The invention also involves swapping out a user's entertainment profile for another person's entertainment profile, such as that for 'cooler' individuals (as perceived by the average consumer). The consumer would have the option to constantly swap out an entertainment profile for another entertainment profile, and so on and so on. The options are numerous and could evolve as a person's interests evolve.

Conventional media technology, such as, Netflix, Hulu, HBO Now, iTunes, On Demand cable, etc., is based on a system that recommends content, e.g., TV shows, series, movies, etc., that is aimed at a single person's interests, which gets boring after a while. Conventional media libraries, such as, Netflix, Hulu, HBO Now, iTunes, On Demand cable, etc. provide a one-dimensional media experience to the user, where the user's media library is limited to content from the user's own single media interest.

Conventional media technology is not hitting on one of the aspects that makes TV shows, series, movies, etc. interesting to consumers-the cool factor. The cool factor comes from people who have huge consumer appeal and generally are kept out of the media technology model. This notion of the cool factor attributes the cool factor to celebrities and their media interests and libraries. An example of this notion was when Mark Zuckerberg was designing his home AI project, and Mark Zuckerberg had actor Morgan Freeman, a popular celebrity with a well-known voice, do the voice of his home AI assistant. Morgan Freeman's voice was used to give the AI project the cool factor, based on the notion of attributing this cool factor to celebrities.

Conventional media technology is very one-dimensional. Conventional media technology does not include in a consumer's content library some of the aspects of a profile of a celebrity, for instance, or others having huge consumer appeal, on which the film industry bases its marketing model, who therefore are kept out of the conventional media technology model. Much of the TV shows, series, movies, etc. business is concentrated around celebrities that have huge consumer market appeal. Consumers are greatly interested in the TV shows, series, movies, etc. associated with their favorite celebrities.

Consumers often have an emotional connection with celebrities, sports figures, athletes, notable famous individuals, etc., outside of the framework of people known by a user. However, conventional media technology depends largely on focusing on the user's own individual interests, or working within a framework of people the user knows, disconnecting a user's emotional connection with a celebrity from the user's conventional media experience. The film industry is highly tuned into this concept or phenomenon of celebrity relevance, and its business model is heavily based on this fact. Although the conventional media technology model is based on the concept that consumers find TV shows, series, movies, etc. interesting when linked to celebrities that have huge consumer market appeal, the conventional media technology model operates separate from and does not engage the relevance of celebrity media interests and libraries.

As described below, embodiments of the present invention include the creation, maintenance and use of user profiles in Internet-based television, including social media models, using systems and methods different from those of the prior art systems and methods.

SUMMARY OF THE EMBODIMENTS

The invention is directed to systems, methods and apparatus involving creation, maintenance and swapping of user profiles in a user-specific networked environment.

The present invention involves making media technology a more innovative, appealing consumer experience, something that is new, pushes technology forward, pushes the consumer experience forward, and brings a real value to the consumer. This invention may provide the consumer with a real value around the phenomenon of celebrity relevance to the consumer. The invention is focused on providing a significant value back to the consumer, which media technology companies are not doing. The present invention goes beyond and outside of a limited social networking structure. This invention could change some of the negative associations consumers have about the cost of media content and subscription models. This invention enables a system to link and combine the elements of celebrity relevance and the influences of TV shows, series, movies, etc. associated with celebrities. The present invention has the potential to bring the elements of celebrity relevance and celebrity influence closer together, closer to the consumer.

The invention involves swapping out a user's entertainment profile for another person's entertainment profile, such as that for 'cooler' individuals (as perceived by the average consumer). The consumer would have the option to constantly swap out an entertainment profile for another entertainment profile, and so on and so on. The options are numerous and could evolve as a person's interests evolve. The present invention provides an entertainment engagement experience that is meant to be ongoing and could be a far more social entertainment experience than the conventional entertainment experience available now. The consumers are constantly engaging in the entertainment experience

- they are selecting what they want their entertainment experience to be, and the options are open-ended with this model. This invention could include swapping out a user's entertainment profile for a celebrity's entertainment profile, which could be an exciting consumer experience for the user, and far more dynamic and proactive entertainment experience than the conventional entertainment experience we have now. Preferably the celebrity's entertainment profile is completely authentic, as inauthentic or fake profiles would detract from bringing real value to the consumer.

The present invention could do away with the old entertainment model. The present invention takes the concept of celebrity relevance and celebrity influence and applies it in a digital world at the level of an individual consumer by fully swapping profiles. Individual consumers would want to swap a profile because people's interests in TV shows, series, movies, etc. are always ever-changing, they are not static. Swapping a full profile is an efficient and fast way to immediately give a consumer a new entertainment experience around the consumer's interests in TV shows, series, movies, etc. in real time. The invention brings together elements that currently operate separately, by blending the phenomenon around celebrity appeal used by the film industry and others, and the fact that consumer interests in TV shows, series, movies, etc. are undeniably linked to these elements.

In accordance with a first aspect of the invention, a profile swapping system is disclosed, in which the system comprises: an intermediary system adapted to connect to a network and adapted to manage interaction of a user on the network based on a profile-in-use being used by the user; and a profile system adapted to manage profiles within the intermediary system and adapted to manage swapping of profiles for use by the user in interacting on the network; wherein the profile system includes a user profile for the user and at least one other's profile; and wherein the profile system is adapted to enable the user to swap the user profile for the other's profile, whereby the user profile is swapped out as the profile-in-use and the other's profile is swapped in as the profile-in-use by the user.

In accordance with a second aspect of the invention, a method for providing a profile swapping system is disclosed, in which the method comprises: providing an intermediary system adapted to connect to a network and adapted to manage interaction of a user on the network based on a profile-in-use being used by the user; using the intermediary system to manage interaction of the user on the network based on the profile-in-use being used by the user; providing a profile system adapted to manage profiles within the intermediary system and adapted to manage swapping of profiles for use by the user in interacting on the network; using the profile system to manage the profiles within the intermediary system and to manage swapping of profiles for use by the user in interacting on the network; wherein the profile system includes a user profile for the user and at least one other's profile; and wherein the profile system is adapted to enable user to swap the user profile for the other's profile, whereby the user profile is swapped out as the profile-in-use and the other's profile is swapped in as the profile-in-use by the user.

In accordance with a third aspect of the invention, a method of profile swapping is disclosed, in which the method comprises: providing access, to a user logged on to a user device using a user account, to an intermediary system adapted to connect to a network and adapted to manage interaction of a user on the network based on a profile-in-use being used by the user; using the intermediary system to manage interaction of the user on the network based on the profile-in-use being used by the user; providing access to the user to a profile system adapted to manage profiles within the intermediary system and adapted to manage swapping of profiles for use by the user in interacting on the network; wherein the profile system includes a user profile for the user and at least one other's profile; and wherein the profile system is adapted to enable the user to swap the user profile for the other's profile, whereby the user profile is swapped out as the profile-in-use and the other's profile is swapped in as the profile-in-use by the user; and swapping profiles for use by the user in interacting on the network using the profile system.

Further aspects of the invention are set forth herein. The details of exemplary embodiments of the invention are set forth in the accompanying drawings and the description below. Other features, objects, and advantages of the invention will be apparent from the description and drawings, and from the claims.

BRIEF DESCRIPTION OF THE DRAWINGS

By reference to the appended drawings, which illustrate exemplary embodiments of this invention, the detailed description provided below explains in detail various features, advantages and aspects of this invention. As such, features of this invention can be more clearly understood from the following detailed description considered in conjunction with the following drawings, in which the same reference numerals denote the same, similar or comparable elements throughout. The exemplary embodiments illustrated in the drawings are not necessarily to scale or to shape and are not to be considered limiting of its scope, for the invention may admit to other equally effective embodiments having differing combinations of features, as set forth in the accompanying claims.

LISTING OF DRAWING REFERENCE NUMERALS

Below are reference numerals denoting the same, similar or comparable elements throughout the drawings and detailed description of the invention:

- 10000: a Network 10000
  - 11000: a User 11000
    - 11100: a User Device 11100
      - 11110: a Content 11110
    - 11200: a User Account 11200
      - 11210: a Profile-in-Use 11210
  - 12000: an Intermediary System 12000
    - 12100: a Profile System 12100
      - 12110: a User Profile 12110
        - 12112: a User Entertainment Profile 12112
          - 12113: a Change 12113 to a Profile
      - 12120: an Other's Profile 12120
        - 12122: an Other's Entertainment Profile 12122
          - 12123: an Other's Change 12123 to a Profile
    - 12200: an Intermediary Interface 12200
      - 12210: an Intermediary Index 12210
      - 12220: an Intermediary Index Identification 12220
  - 14000: a Content Provider System 14000
    - 14100: a Content Subscription 14100
      - 14110: a Content File 14110
  - 15000: a Social Media System 15000
    - 15100: a Social Media Account 15100
      - 15110: Social Media Data 15110
  - 20000: a Method of Profile Swapping 20000
    - 20100: a User logs on 20100 to a User Device using a User Account
      - 20110: the User Device accesses 20110 a Social Media System using the User Profile as the Profile-in-use
      - 20120: the User Device accesses 20120 the Intermediary System using the User Account
        - 20121: the User accesses 20121 the Profile System of the Intermediary System
          - 20122: the User swaps out 20122 the User Profile as the Profile-in-use for an Other's Profile, swapping in the Other's Profile, thereby making the Other's Profile the new Profile-in-use
            - 20113: the User selects a detail of the Other's Profile as a Change added to the User Profile
              - 20114: the Profile System changes the User Profile to add the detail from the Other's Profile and to indicate in the User Profile that the detail added came from the Other's Profile
      - 20130: the User Device accesses a Social Media System using the Other's Profile as the Profile-in-use, after the User having swapped out the User Profile and swapped in the Other's Profile

DETAILED DESCRIPTION OF THE EMBODIMENTS

The invention is directed to systems, methods and apparatus involving creation, maintenance and swapping of user profiles in a user-specific networked environment intended for use in IP TV, Streaming TV services (e.g., Netflix, Hulu, HBO Now, YouTube TV, and others), Streaming TV devices (e.g., Apple TV, Roku, Amazon Fire, Google Chromecast, and others), and social media models (e.g., Facebook, and others).

The present invention of swapping entertainment profiles creates a multi-dimensional media experience. The present invention brings celebrities and their media interests and libraries into a new media model. The present invention is envisioned to be all-inclusive on who you can swap your entertainment profile out for; it should broadly cover interests and individuals: celebrities (e.g., the list of celebrities with huge consumer appeal is endless, and includes, Julia Roberts, Sandra Bullock, Jennifer Lopez, Scarlett Johansson, Jennifer Aniston, Jennifer Lawrence, Emma Stone, Anne Hathaway, Melissa McCarthy, Russell Crowe, Tom Hanks, Robert DeNiro, Denzel Washington, Mark Wahlberg, Leonardo DiCaprio, Tom Cruise, George Clooney, Brad Pitt, and Ryan Reynolds, etc.), film directors (e.g., James Cameron, Steven Spielberg, Francis Ford Coppola, Eleanor Coppola, George Lucas, Ron Howard, Ridley Scott, Steven Soderbergh, Ryan Murphy, Martin Scorsese, and Oliver Stone, etc.), screenwriters (e.g., Danny Strong, Aaron Sorkin, and Cameron Crowe, etc.), cinematographers (e.g., Emmanuel Lubezki, and Salvatore Totino, etc.), sports figures (e.g., from the MLB, NFL, NHL, NASCAR, soccer, golf, and tennis, etc.), world-class athletes, Olympic athletes, cool entrepreneurs, millennial entrepreneurs, astrophysicists (e.g., Neil deGrasse Tyson, among others), famous environmental scientists or leaders, authors (e.g., Ron Chernow, among others), journalists (e.g., Ta-Nehisi Coates, among others), historians (e.g., Eric Foner, and Jeff Shesol, etc.), MIT professors or world-famous professors, Pulitzer Prize winning writers, documentary filmmakers (e.g., Ken Burns, among others), fascinating people (e.g., Apple's design genius Jony Ive, or maybe Bono). A user might find that having Jony Iye's entertainment profile on the user's Apple device would be incredibly exciting. A user could also swap out the user's entertainment profile for that of friends and family. The swapping options with this invention are numerous.

Aspects of the present invention involve a user having and/or creating an entertainment profile, and having the ability to swap that entertainment profile with that of any other individual, with or without swapping the entire profile of the other person. A user would have the ability on a platform to flag, highlight, or label in the entertainment profile the content, such as the TV shows/series a user is hooked on, and movies that are the user's top favorites, and/or their entire library of content of TV shows/series, movies, and documentaries and to swap this full entertainment profile with that of another individual. This entertainment profile would have the potential to include hundreds of movies, TV shows/series, and documentaries. For example, if a user is obsessed with binge-watching the TV series Outlander, the user could swap its entertainment profile for that of any cast member, director, writer to see what the other person has flagged as that other person's binge-watched TV series, top favorites movies, etc. Users would be able to designate privacy levels of profile attributes, such as 'publicly accessible,' 'private,' or 'semi-private' (e.g., shared with specified individuals).

An entertainment profile could also include a user's comments on the TV shows, series, movies, etc. According to aspects of the present invention, a user may find it exciting to see what other individuals (including any celebrities) have flagged as their binge-watched TV shows, favorite movies, etc. The present invention leverages the possibility that a user may be interested in content, e.g., a TV series or movie, that the user may not otherwise have considered, apart from the content appearing in an entertainment profile in which the user was interested, making the user more likely to watch that TV series, movie, etc.

In another example, the user may wish to swap out their entertainment profile with that of a famous trainer, a professional athlete, a fitness instructor, and/or a celebrity, whose entertainment profile may house training programs and/or exercise routines. In a further example, the user may wish to swap out their entertainment profile with that of a celebrity, a director, or a writer, whose entertainment profile may include a music library housing podcasts, audiobooks, music libraries, and music playlists, etc.. In an additional example, the user may wish to swap out their entertainment profile with that of a famous author, a famous journalist, a professor, a historian, a Pulitzer Prize-winning writer, an environmental scientist, and/or a documentary filmmaker, etc., which may house a list of favorite literature, articles, and/or films associated with the famous user.

A user may be enabled to add content, e.g., a movie, TV show, series, etc., to the user's own entertainment profile, either while viewing its own entertainment profile, or while viewing another person's entertainment profile. In some embodiments, the system may track the origin of an addition to the user's profile. For example, when a user adds a movie, TV show, or series from someone else's profile to the user's own profile, the system would keep that information, possibly indicating it parenthetically next to the content description, reminding the user that the particular movie, TV show, series, etc., was added to the user's profile from a given swapped-in profile, of for instance, a celebrity, director, etc. The user may find it exciting to have adopted a recommendation from someone else's profile, especially that of a celebrity.

In some embodiments of the present invention, the entertainment profile may be accompanied by privileges or subscriptions to related content, such that a user may be able to view the content through the selected entertainment profile. For example, once a user swaps or exchanges a profile for that of another person, such as a celebrity, director, writer, or anyone at all, and the user is able to view the other person's entertainment profile, the system would look at the user's accessible content across the connected platforms for which the user has access, paid or otherwise, such as Netflix, Hulu, HBO Now, iTunes, On Demand cable, etc. The system would indicate, such as with an icon, font, style, color, box or column, in the new swapped-in profile which content the system can pull for the user immediately because the user has access to the content through a connected platform. Conversely, the system could also indicate, such as with an icon, font, style, color, box or column, which content in the new swapped-in profile that is not part of your paid library. The system also could give the user the option to gain access to the content, such as through logging on to a new connected platform, creating a new subscription on a new connected platform, or making a purchase through an existing connected platform. The system could refresh the indications of connected, accessible content periodically, such as every time a user opened or swapped a profile.

In some embodiments of the present invention, profiles would be created and maintained as a combination of user-input data and system-generated data. User-input data could include information that the user enters, selects and defines directly. System-generated data could include information that is derived from various activities and sources, associated with a user, and combined to generate aspects of a user profile, such as standard tracking data of a user's Internet activity or social media activity. Data could be characterized as 'hard' data to the extent that the data are derived from actual events (e.g., purchases, page views, video views). Data may be characterized as 'soft' data to the extent the data are derived from expressed opinions or preferences, which may or may not be based in reality or on actual events. Some data may be a mix of 'hard' and 'soft' data; for instance, 'hard-soft' data may be derived from actual events (e.g., "likes") that reflect opinions or preferences, which may or may not be genuine (e.g., a disingenuous "like" to placate a friend). Similarly, 'soft-hard' data may be derived from communications and expressed opinions about actual events (e.g., hearsay, stated motives, or expressed intent associated with an event), although not derived directly from the actual event. A user's choice to swap in a particular profile could be characterized as a 'hard-soft' data point, derived from the actual event of the swap that reflects an implicit preference or curiosity for the swapped-in profile. A user's choice of swapped-in profiles itself may prompt the system to recommend other similar or related profiles to the user that the user may want swap in to explore. The system could also indicate the celebrities, directors, writers, etc. that have similar taste in TV shows, series, movies, etc. as the user. The system could also include a rating system, either numerical or other format, to indicate how similar each individual profile is to the user's own entertainment profile.

Numerous possible embodiments of the profile swapping system are envisioned. An exemplary embodiment of the invention is described below and depicted in the accompanying drawing.

Referring to the Figures, a profile swapping system may interact with numerous existing systems across a distributed network, such as the Internet in general.

Figure 1:
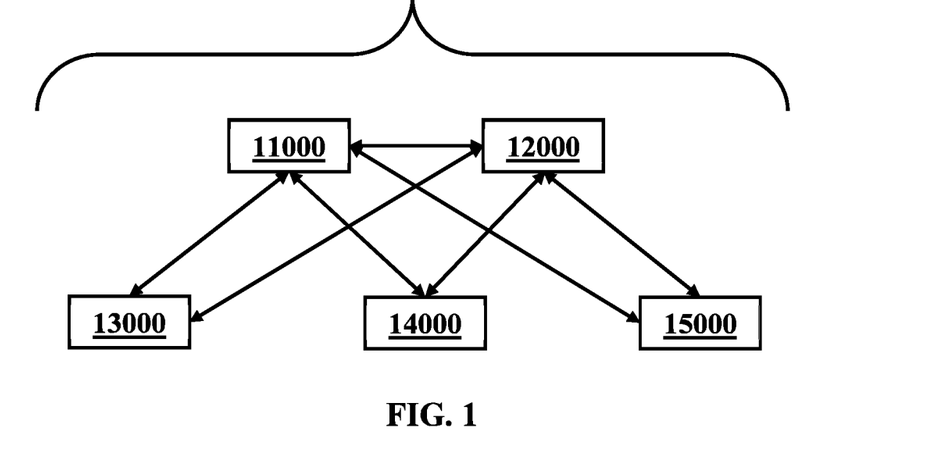
FIG. 1 shows a block diagram of an exemplary embodiment of the invention depicting an exemplary Network, according to aspects of the invention.

Referring to FIG. 1, FIG. 1 shows a block diagram of an exemplary Network 10000 including a User 11000 associated with the Network 10000, an Intermediary System 12000 connected to the Network 10000, a Content Provider System 14000 connected to the Network 10000, and a Social Media System 15000 connected to the Network 10000. The Network 10000 may include the Internet, for example, embodying primarily the physical interconnectivity through which the other systems interact.

Figure 2:
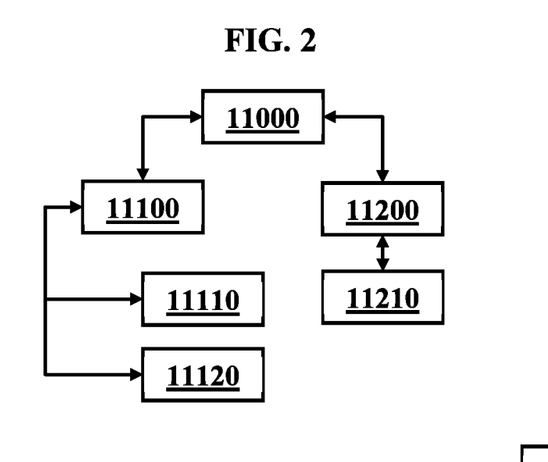
FIG. 2 shows a block diagram of an exemplary User who may access the Network of FIG. 1 and to whom content would be directed, according to aspects of the invention.

Referring to FIG. 2, FIG. 2 shows a block diagram of an exemplary User 11000 who may access the Network 10000 and to whom content would be directed. A User 11000 may have or be associated with a User Device 11100 that may access the Network 10000. The User 11000 may interact with systems and components accessible through the Network 10000, which may include, for instance, Content 11110 delivered to User Device 11100. The User 11000 may log on to the User Device 11100 using a User Account 11200 associated with the User 11000. The User Account 11200 is associated with a Profile-in-Use 11210 by the User 11000 on User Device 11100.

Figure 3:
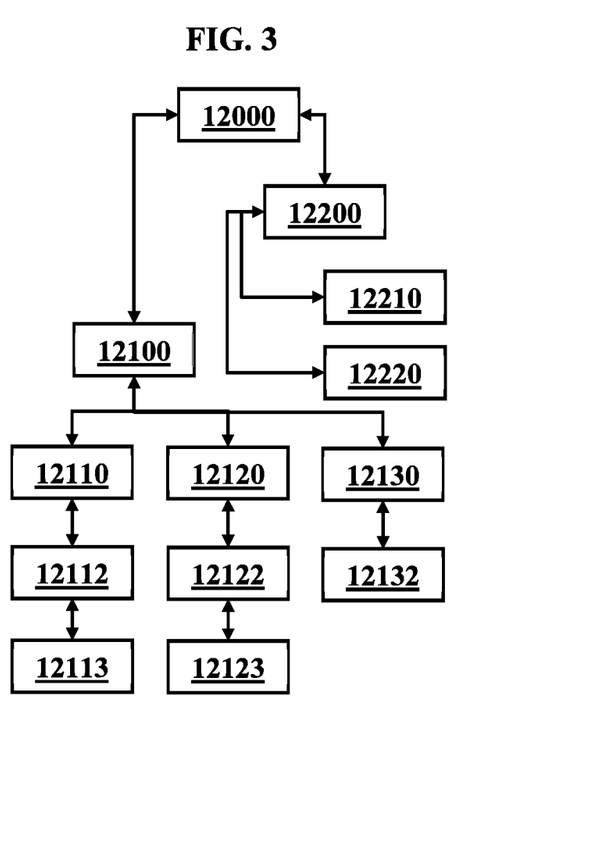
FIG. 3 shows a block diagram of an exemplary Intermediary System connected to the Network of FIG. 1, according to aspects of the invention.

Referring to FIG. 3, FIG. 3 shows a block diagram of an exemplary Intermediary System 12000 connected to the Network 10000. An Intermediary System 12000 may include a Profile System 12100 and an Intermediary Interface 12200 through which the Intermediary System 12000 interacts with. The Profile System 12100 may include a plurality of profiles, broadly divided between a User Profile 12110 and an Other's Profile 12120 (i.e., a profile of something or someone other than the User 11000). The User Profile 12110 may include one or more sub-profiles, such as a User Entertainment Profile 12112.

The User Profile 12110 may be changed, for example, by the User 11000 or by the Profile System 12100, such as a Change 12113 to the User Entertainment Profile 12112. The Other's Profile 12120 likewise may include sub-profiles, like an Other's Entertainment Profile 12122, and may include Other's Changes 12123. In an illustrative example, the User 11000 may change the User Profile 12110 to the Other's Profile 12120, which may include a training program or an exercise routine associated with a famous trainer, a professional athlete, a fitness instructor, and/or a celebrity.

In some examples, the User Entertainment Profile 12112 may have a format similar to that of a music library, and as such, may include podcasts, audiobooks, music libraries, and music playlists, etc.. The User 11000 may change the User Entertainment Profile 12112 to the Other's Entertainment Profile 12122. The Other's Entertainment Profile 12122 may be an entertainment profile of a celebrity, a director, or a writer, among other examples. In an illustrative example, the User 11000 may change the User Entertainment Profile 12112 to the Other's Entertainment Profile 12122, which include swapping in a music library or playlist of a celebrity, such as Bono.

In further examples, the User 11000 may change the User Entertainment Profile 12112 to the Other's Entertainment Profile 12122, which may include swapping in a list of favorite literature, articles, and/or films associated with a famous author, a famous journalist, a professor, a historian, a Pulitzer Prize-winning writer, an environmental scientist, and/or a documentary filmmaker, etc.

An Intermediary Interface 12200 may include a variety of networking equipment, hardware and software, such as servers, encryption, access restrictions, user identification and authorization, application programming interfaces. In some embodiments, the Intermediary Interface 12200 may comprise a Virtual Private Network (VPN), within which the User 11000 connects to and engages with the Network 10000, in order to allow the Intermediary Interface 12200 to implement a Profile-in-use 11210 being used by the User 11000 at the time. The Intermediary Interface 12200 may act as a trusted intermediary between the User 11000 and other systems and components on the Network 10000, the Content Provider System 14000, and the Social Media System 15000. To facilitate interaction between a User 11000 and others on the Network 10000, in accordance with the selection by the User 11000 of a particular Profile-in-use 11210 associated with the User Device 11100 during the interaction, the Intermediary Interface 12200 may include and utilize an Intermediary Index 12210 having a catalog of all profile details indexed and preferably anonymized to a plurality of Intermediary Index Identifications 12220. Each Intermediary Index Identification 12220 may include, for example, an individual alphanumeric reference to the Interface Index 12210 that represents the combination of profile details associated with a Profile-in-use 11210.

Figure 4:
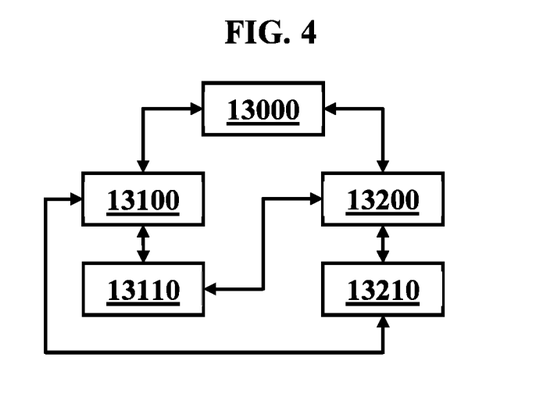
FIG. 4 shows a block diagram of an exemplary system connected to the Network of FIG. 1, according to aspects of the invention.

Referring to FIG. 4, FIG. 4 shows a block diagram of an exemplary system connected to the Network 10000 and through the Network 10000 with other systems and components connected to the Network 10000. The system may be connected to the Intermediary System 12000 through the Network 10000.

Figure 5:
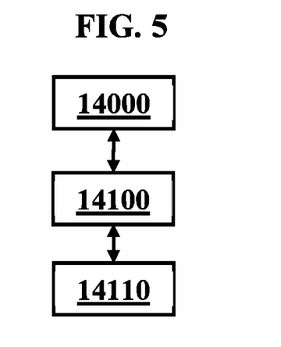
FIG. 5 shows a block diagram of an exemplary Content Provider System connected to the Network of FIG. 1, according to aspects of the invention.

Referring to FIG. 5, FIG. 5 shows a block diagram of an exemplary Content Provider System 14000 connected to the Network 10000. A Content Provider System 14000 may be connected to the Intermediary System 12000 through the Network 10000 and may include content accessible without a Content Subscription 14100, with a Content Subscription 14100, or both. A User 11000 may have a Content Subscription 14100, which may associated with the User's Account 11200 within the Profile System 12100. The Profile System 12100 may connect to the Content Provider System 14000 to determine what content is available to the User 11000 based on the User Account 11200, such as when the User 11000 accesses the User Entertainment Profile 12112. From the available content, the User 11000 may select a Content File 14110 selected for delivery to User Device 11100.

Figure 6:
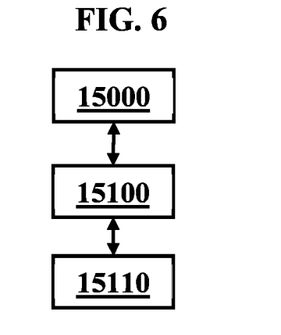
FIG. 6 shows a block diagram of an exemplary Social Media System connected to the Network of FIG. 1, according to aspects of the invention.

Referring to FIG. 6, FIG. 6 shows a block diagram of an exemplary Social Media System 15000 connected to the Network 10000. A Social Media System 15000 may be connected to the Intermediary System 12000 through the Network 10000 and may include a plurality of Social Media Accounts 15100. The User 11000 may have a Social Media Account 15100 associated with User Account 11200 within Profile System 12100, and depending on what the Social Media System 15000 permits, the User 11000 may swap its User Profile 12110 for a Profile-in-use 11210 and thereby also swap associated Social Media Accounts 15100, or alternatively swap out the details and characteristics associated with the Social Media Account 15100 of the User 11000. Based on the interaction of the User 11000 with the Social Media System 15000 and the Profile-in-use 11210 active in the Profile System 12100, the Social Media System 15000 may offer and deliver Social Media Data 15110 selected for delivery to User Device 11100.

Methods in accordance with aspects of the invention include, for instance, a method of swapping profiles; a method of providing a profile swapping system; a method of delivering entertainment content using a profile system managed by an intermediary system and adapted to swap profiles in and out for a given user; and a method of accessing a social media system using a profile system managed by an intermediary system and adapted to swap profiles in and out for a given user.

Figure 7:
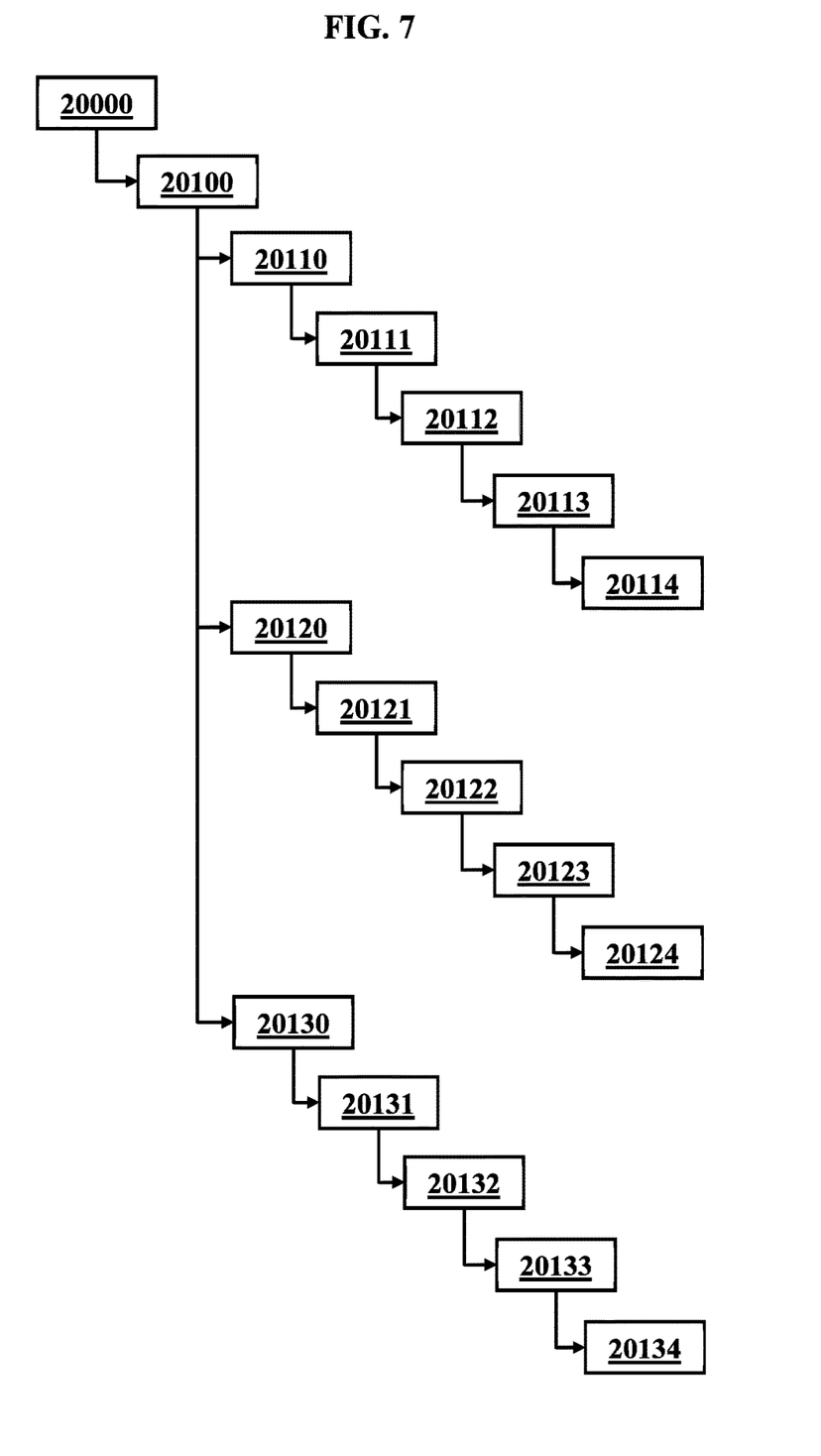
FIG. 7 shows a block diagram of exemplary steps of an exemplary method of profile swapping, according to aspects of the invention.

Referring to FIG. 7, FIG. 7 shows a block diagram of exemplary steps of an exemplary Method 20000 of Profile Swapping, according to aspects of the invention. The exemplary embodiment of Method 20000 begins with exemplary Step 20100, in which a User logs on 20100 to a User Device 11000 using a User Account 11200.

FIG. 7 depicts a first subprocess beginning with Step 20110, as the User Device accesses 20110 a Social Media System 15000 using the User Profile 12110 as the Profile-in-use 11210. FIG. 7 depicts a second subprocess beginning with Step 20120, as the User Device 11100 accesses 20120 the Intermediary System 12000 using the User Account 11200. In Step 20121, the User 11000 accesses 20121 the Profile System 12100 of the Intermediary System 12000. In Step 20122, the User 11000 swaps out 20122 the User Profile 12110 as the Profile-in-use 11210 for an Other's Profile 12120, swapping in the Other's Profile 12120, thereby making the Other's Profile 12120 the new Profile-in-use 11210. In Step 20113, the User 11000 selects 20113 a detail of the Other's Profile 12120 as a Change 12113 added to the User Profile 12110. In Step 20114, the Profile System 12000 changes 20114 the User Profile 12110 to add the detail from the Other's Profile 12120 and to indicate in the User Profile 12110 that the detail added came from the Other's Profile 12120.

FIG. 7 depicts a third subprocess beginning with Step 20130, as the User Device 11100 accesses 20130 a Social Media System 15000 using the Other's Profile 12120 as the Profile-in-use 11210, after the User 11000 has swapped out the User Profile 12110 and swapped in the Other's Profile 12120.

The foregoing description discloses exemplary embodiments of the invention. While the invention herein disclosed has been described by means of specific embodiments and applications thereof, numerous modifications and variations could be made thereto by those skilled in the art without departing from the scope of the invention set forth in the claims. Modifications of the above disclosed apparatus and methods that fall within the scope of the claimed invention will be readily apparent to those of ordinary skill in the art. Accordingly, other embodiments may fall within the spirit and scope of the claimed invention, as defined by the claims that follow hereafter.

In the description above, numerous specific details are set forth in order to provide a more thorough understanding of embodiments of the invention. It will be apparent, however, to an artisan of ordinary skill that the invention may be practiced without incorporating all aspects of the specific details described herein. Not all possible embodiments of the invention are set forth verbatim herein. A multitude of combinations of aspects of the invention may be formed to create varying embodiments that fall within the scope of the claims hereafter. In addition, specific details well known to those of ordinary skill in the art have not been described in detail so as not to obscure the invention. Readers should note that although examples of the invention are set forth herein, the claims, and the full scope of any equivalents, are what define the metes and bounds of the invention protection.

What is clamied is:

1. A profile swapping system comprising:
    an intermediary processor adapted to connect to a network and adapted to manage interaction of a user on the network based on a profile-in-use being used by the user;
    a profile system processor adapted to manage profiles within the intermediary processor and adapted to manage swapping of profiles for use by the user in interacting on the network;
        wherein the profile system processor includes a full user profile for the user and at least one other's full profile; and
        wherein the profile system processor is adapted to enable the user to swap the full user profile for the other's full profile, whereby the full user profile is swapped out as the profile-in-use and the other's full profile is swapped in as the profile-in-use by the user; and
    an intermediary interface processor adapted to manage use and interpretation of the profile-in-use by other systems connected to the network and interacting with the user through the intermediary processor and based on the profile-in-use,
        wherein the intermediary interface processor includes a virtual private network (VPN) adapted to present the profile-in-use to other systems connected to the network, and
        wherein the profile-in-use informs the interaction of the use with the other systems on the network, wherein the user has immediate real time control to swap the full user profile for the other's full profile.

2. The system of claim 1, wherein the intermediary interface processor includes:
    an intermediary index having information details characterizing the profiles; and,
    an intermediary index identification for each indexed profile, wherein the intermediary index identification is adapted to identify a profile to the other systems connected to the network.

3. The system of claim 1, wherein:
    the profile system processor further is adapted to enable the user to make changes to details of the full user profile and is adapted to track and indicate in the full user profile the origin of the changes.

4. The system of claim 1, wherein:
    the profile system processor further includes an entertainment profile within the full user profile, and the profile system processor is adapted to enable the user to swap the entertainment profile of the full user profile for an other's entertainment profile of an other's full profile, making the other's entertainment profile a part of the profile-in-use by the user.

5. The system of claim 4, wherein:
    the entertainment profile includes content subscription information for the user regarding a content provider system, and the entertainment profile is adapted to cross-reference information details for content mentioned in a profile-in-use with access permissions available through the content subscription, and the entertainment profile is adapted to be able to indicate to the user which content mentioned in a profile-in-use is available to the user from the content provider system based on the access permissions of the content subscription,
    wherein the content subscription information of the entertainment profile of the full user profile is used for indicating to the user which content mentioned in a profile-in-use is available to the user when the profile-in-use includes the other's entertainment profile or the other's full profile.

6. A method for providing a profile swapping system, the method comprising:
    providing an intermediary processor adapted to connect to a network and adapted to manage interaction of a user on the network based on a profile-in-use being used by the user;
    using the intermediary processor to manage interaction of the user on the network based on the profile-in-use being used by the user;
    providing a profile system processor adapted to manage profiles within the intermediary processor and adapted to manage swapping of profiles for use by the user in interacting on the network;
    using the profile system processor to manage the profiles within the intermediary processor and to manage swapping of profiles for use by the user in interacting on the network,
        wherein the profile system processor includes a full user profile for the user and at least one other's full profile; and wherein the profile system processor is adapted to enable the user to swap the full user profile for the other's full profile, whereby the full user profile is swapped out as the profile-in-use and the other's full profile is swapped in as the profile-in-use by the user;

providing an intermediary interface processor adapted to manage use and interpretation of the profile-in-use by other systems connected to the network and interacting with the user through the intermediary processor and based on the profile-in-use;

using the intermediary interface processor to manage use and interpretation of the profile-in-use by other systems connected to the network and interacting with the user through the intermediary processor and based on the profile-in-use,    wherein the intermediary interface processor includes a virtual private network (VPN) adapted to present the profile-in-use to other systems connected to the network, and    wherein the profile-in-use informs the interaction of the use with the other systems on the network; and presenting the profile-in-use to other systems connected to the network, wherein the user has immediate real time control to swap the full user profile for the other's full profile.

7. The method of claim 6, wherein:

the intermediary interface processor includes: an intermediary index having information details characterizing the profiles; and, an intermediary index identification for each indexed profile, wherein the intermediary index identification is adapted to identify a profile to the other systems connected to the network; and the method further comprising: identifying the profile to the other systems connected to the network.

8. The method of claim 7, wherein: the intermediary processor is adapted to communicate the intermediary index identification to another system.

9. The method of claim 6, wherein:

the profile system processor further is adapted to enable the user to make changes to details of the full user profile and is adapted to track and indicate in the full user profile the origin of the changes; and the method further comprising:

enabling the user to make changes to details of the full user profile; and,    tracking and indicating in the full user profile the origin of the changes.

10. The method of claim 6, wherein:

the profile system processor further includes an entertainment profile within the full user profile, and the profile system processor is adapted to enable the user to swap the entertainment profile of the full user profile for an other's entertainment profile of an other's full profile, making the other's entertainment profile a part of the profile-in-use by the user; and the method further comprising:

swapping the entertainment profile of the full user profile for the other's entertainment profile of the other's full profile; and,    making the other's entertainment profile part of the profile-in-use by the user.

11. The method of claim 10, wherein:

the entertainment profile includes content subscription information for the user regarding a content provider system, and the entertainment profile is adapted to cross-reference information details for content mentioned in the profile-in-use with access permissions available through the content subscription, and the entertainment profile is adapted to be able to indicate to the user which content mentioned in the profile-in-use is available to the user from the content provider system based on the access permissions of the content subscription; wherein the content subscription information of the entertainment profile of the full user profile is used for indicating to the user which content mentioned in a profile-in-use is available to the user when the profile-in-use includes the other's entertainment profile or the other's full profile; and the method further comprising:

cross-referencing information details for content mentioned in the profile-in-use with access permissions available through the content subscription; and,    indicating to the user which content mentioned in the profile-in-use is available to the user from the content provider system based on the access permissions of the content subscription.

12. A method of profile swapping, the method comprising:

providing access, to a user logged on to a user device using a user account, to an intermediary processor adapted to connect to a network and adapted to manage interaction of a user on the network based on a profile-in-use being used by the user;

using the intermediary processor to manage interaction of the user on the network based on the profile-in-use being used by the user;

providing access to the user to a profile system processor adapted to manage profiles within the intermediary processor and adapted to manage swapping of profiles for use by the user in interacting on the network,    wherein the profile processor includes a full user profile for the user and at least one other's full profile, and    wherein the profile system processor is adapted to enable the user to swap the full user profile for the other's full profile, whereby the full user profile is swapped out as the profile-in-use and the other's full profile is swapped in as the profile-in-use by the user;

swapping profiles for use by the user in interacting on the network using the profile system processor;

providing an intermediary interface processor adapted to manage use and interpretation of the profile-in-use by other systems connected to the network and interacting with the user through the intermediary processor and based on the profile-in-use;

using the intermediary interface processor to manage use and interpretation of the profile-in-use by other systems connected to the network and interacting with the user through the intermediary processor and based on the profile-in-use,    wherein the intermediary interface processor includes a virtual private network (VPN) adapted to present the profile-in-use to other systems connected to the network, and    wherein the profile-in-use informs the interaction of the use with the other systems on the network; and presenting the profile-in-use to other systems connected to the network, wherein the user has immediate real time control to swap the full user profile for the other's full profile.

* * * * *